(12) United States Patent
Golub

(10) Patent No.: US 10,463,110 B2
(45) Date of Patent: Nov. 5, 2019

(54) SHOE-LAST MODIFICATION METHOD AND SYSTEM BASED ON APPLICATION OF ADDITIVE PATCHES

(71) Applicant: ELSE CORP S.r.l., Milan (IT)

(72) Inventor: Andrey Golub, Milan (IT)

(73) Assignee: Else Corp. S.r.l., Milan (IT)

( * ) Notice: Subject to any disclaimer, the term of this patent is extended or adjusted under 35 U.S.C. 154(b) by 0 days.

(21) Appl. No.: 15/959,990

(22) Filed: Apr. 23, 2018

(65) Prior Publication Data

US 2018/0317610 A1 Nov. 8, 2018

(30) Foreign Application Priority Data

May 2, 2017 (IT) .................. 102017000047089

(51) Int. Cl.
*A43D 3/02* (2006.01)
*A43D 1/02* (2006.01)
(Continued)

(52) U.S. Cl.
CPC ............ *A43D 3/027* (2013.01); *A43B 3/0036* (2013.01); *A43D 1/025* (2013.01); *B29C 64/118* (2017.08);
(Continued)

(58) Field of Classification Search
CPC ........ A43D 3/027; A43D 1/025; B33Y 10/00; B33Y 50/02; B33Y 80/00; B29C 64/1124;
(Continued)

(56) References Cited

U.S. PATENT DOCUMENTS 4,884,309 A 12/1989 Shafir
2004/0168329 A1 9/2004 Ishimaru
(Continued)

FOREIGN PATENT DOCUMENTS

EP 1354529 A 10/2003
WO WO 2009/035831 A1 3/2009

OTHER PUBLICATIONS

Ministero Dello Sviluppo Economico (Ministry of Economic Development) "Italian Search Report for related Italian Patent Serial No. IT 201700047089", dated Dec. 20, 2017 (2 Pages).
(Continued)

*Primary Examiner* — Mohammad Ali
*Assistant Examiner* — Joshua T Sanders
(74) *Attorney, Agent, or Firm* — Mark Malek; Widerman Malek, PL

(57) ABSTRACT

The present invention provides a method (200) of modifying a shoe-last, comprising: acquiring (201) current digital data representing a foot shape; providing (202) reference digital data representing a shoe-last shape to be modified; comparing (203) the current digital data with the reference digital data to design patch shapes and patch positions; providing a shoe-last corresponding to the reference digital data; producing (204) patch elements corresponding to the patch shapes; and applying (204) the patch elements on the shoe-last in accordance with the patch positions obtaining a modified shoe-last. The production and the application of the patch elements on the shoe-last are performed by employing an additive manufacturing technique.

16 Claims, 3 Drawing Sheets

(51) Int. Cl.
| | |
|---|---|
| *A43B 3/00* | (2006.01) |
| *B33Y 10/00* | (2015.01) |
| *B33Y 50/02* | (2015.01) |
| *B33Y 80/00* | (2015.01) |
| *B29C 64/393* | (2017.01) |
| *B29C 64/153* | (2017.01) |
| *B29C 64/118* | (2017.01) |
| *B29C 64/124* | (2017.01) |
| *G05B 19/4099* | (2006.01) |
| *B33Y 70/00* | (2015.01) |
| *B29L 31/00* | (2006.01) |

(52) U.S. Cl.
CPC .......... *B29C 64/124* (2017.08); *B29C 64/153* (2017.08); *B29C 64/393* (2017.08); *B33Y 10/00* (2014.12); *B33Y 50/02* (2014.12); *B33Y 80/00* (2014.12); *G05B 19/4099* (2013.01); *A43D 2200/60* (2013.01); *B29L 2031/757* (2013.01); *B33Y 70/00* (2014.12); *G05B 2219/45243* (2013.01); *G05B 2219/49019* (2013.01)

(58) Field of Classification Search
CPC ... B29C 64/118; B29C 64/153; B29C 64/393; G05B 19/4099
USPC .......................................................... 700/98
See application file for complete search history.

(56) References Cited

U.S. PATENT DOCUMENTS

| | | |
|---|---|---|
| 2008/0104778 A1 | 5/2008 | Drake et al. |
| 2012/0102663 A1* | 5/2012 | Thompson ............ A43D 3/027 |
| | | 12/133 R |
| 2016/0107391 A1 | 4/2016 | Parish et al. |

OTHER PUBLICATIONS

Ministero Dello Sviluppo Economico (Ministry of Economic Development) "Italian Written Opinion for related Italian Patent Serial No. IT 201700047089", dated Dec. 20, 2017 (5 Pages).

EPO, "International Search Report for U.S. Application Serial No. PCT/US2008/073709 filed Aug. 20, 2008", dated Nov. 24, 2008 (2 Pages).

\* cited by examiner

SHOE-LAST MODIFICATION METHOD AND SYSTEM BASED ON APPLICATION OF ADDITIVE PATCHES

CROSS REFERENCE TO RELATED APPLICATIONS

This is a utility patent application which claims the benefit of IT 102017000047089, filed on May 2, 2017, the contents of which are hereby incorporated by reference in its entirety.

BACKGROUND

Technical Field

The present invention relates to the footwear industry, Particularly, the present invention relates shoe-last manufacturing techniques.

Description of the Related Art

In order to improve customer' satisfaction level and manufacture's competitiveness, there is a need for design and manufacturing techniques which allows making customized shoes.

Shoe last is a crucial element of footwear manufacturing. Shoe-last is solid three-dimensional mold around which a shoe is made; it has relatively complex shape and is normally made of high-density polyethylene for footwear production.

With reference to the computer aided shoe-last designing and manufacturing techniques the following documents can be identified:
1) "3D Foot Scan to Custom Shoe Last", Nibedita Rout et al., Special Issue of IJCCT, VVol. 1, Issue 1, 3, 4; 2010 for International Conference, 3-5 Aug. 2010, pages 14-18;
2) Computer Aided Design and Development of Customized shoe Last, Kumar Sambhav et al., Computer-Aided Design & Applications, 8(6) 2011; pages 819-826.
3) "Shoe-last design exploration and customization", Yifan Zhang et al.; *The Journal of the textile Institute*, Vol. 103/No. 5, May 2012, pages 541-548.
4) "Design and manufacture of shoe lasts", X. Ma and A. Luximom, DOI: 10.1533/9780857098795.3.177, 2013.

BRIEF SUMMARY OF THE INVENTION

The Applicant has noticed that the known techniques for design manufacturing shoe lasts do not combine in a satisfying manner the demand for a full customization with the needs for cost reduction and minimal timing.

According to a first aspect, the present invention relates to a method of modifying a shoe-last, comprising:
  acquiring current digital data representing a foot shape;
  providing reference digital data representing a shoe-last shape to be modified;
  comparing the current digital data with the reference digital data to design patch shapes and patch positions;
  providing a shoe-last corresponding to the reference digital data;
  producing patch elements corresponding to said patch shapes;
  applying the patch elements on the shoe-last in accordance with said patch positions obtaining a modified shoe-last;
wherein the production and the application of the patch elements on the shoe-last is performed by employing an additive manufacturing technique.

In accordance with a second aspect the present invention relates to a shoe-last modification system, comprising:
  an acquisition device configured to acquire current digital data representing a foot shape;
  a processing and control module configured to:
  receive reference digital data representing a shoe-last shape;
  compare the current digital data with the reference digital data to design patch shapes and patch positions;
  at least one manufacturing apparatus operating according to an additive manufacturing technique under the control of the processing and control module, the manufacturing apparatus being structured to:
  producing patch elements col-responding to said patch shapes;
  applying the patch elements on a shoe-last corresponding to the reference digital data and in accordance with said patch positions so as to obtain a modified shoe-last.

BRIEF DESCRIPTION OF THE DRAWINGS

Further characteristics and advantages will be more apparent from the following description of a preferred embodiment and of its alternatives given as a way of an example with reference to the enclosed drawings in which.

DETAILED DESCRIPTION OF EXAMPLES

Figure 1:
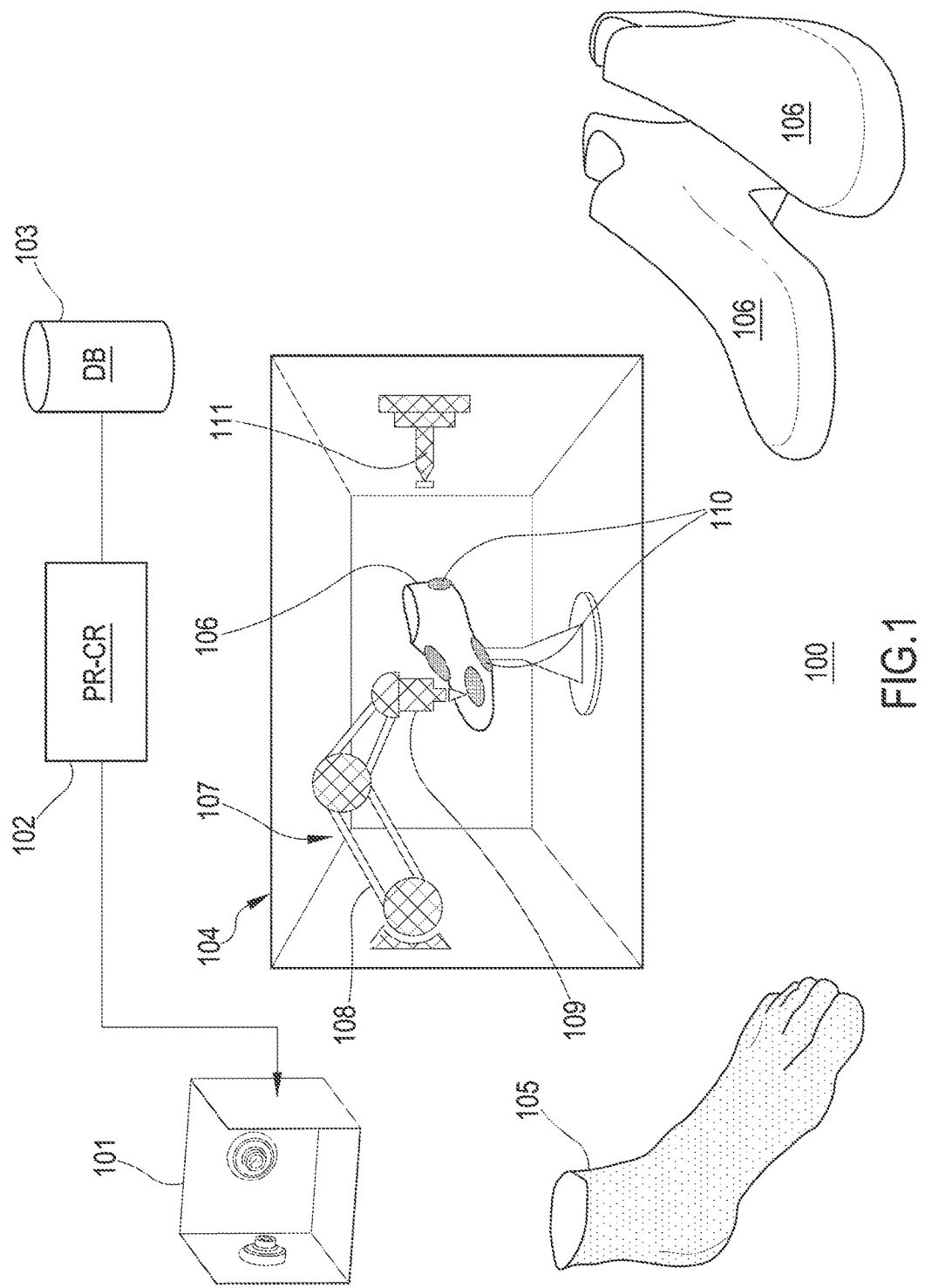
FIG. 1 schematically shows an example of a shoe-last modification system.

FIG. 1 schematically shows an example of a shoe-last modification system 100 comprising an acquisition device 101, a processing and control module 102 (PR-CR), connected to at least one database 103 (DB) and a manufacturing apparatus 104 operating according to an additive manufacturing technique.

The acquisition device 101 can be a 3D scanner configured to collect digital data on the shape (i.e. the external surface) of a customer foot. The processing and control module 102 comprises at least a computer machine in which software suitable to process digital data received from the acquisition device is stored. Moreover, the processing and control module 102 can control the manufacturing apparatus 104. The database 103 stores digital data representing the external surfaces of customer's feet 105 and digital data representing the external surfaces of several pre-manufactured shoe-lasts 106. As known to the skilled person, a shoe-last is a solid 3D mold around which a shoe is made. The shoe-last 106 is made in a material adapted to allow the manufacturing of the shoe and therefore it has suitable resistance to heat, compression and impact.

The manufacturing apparatus 104 can include a device 107 performing Fused Deposition Modeling. Alternatively, the manufacturing apparatus 104 may perform a laser sintering technique or PoLyJet technique or a Stereolithography technique combined with Digital Light Processing technique. In accordance with the example of FIG. 1, the device 107 comprises an articulated arm 108 carrying a head 109 structured to perform Fused Deposition Modeling of powder material.

Figure 2:
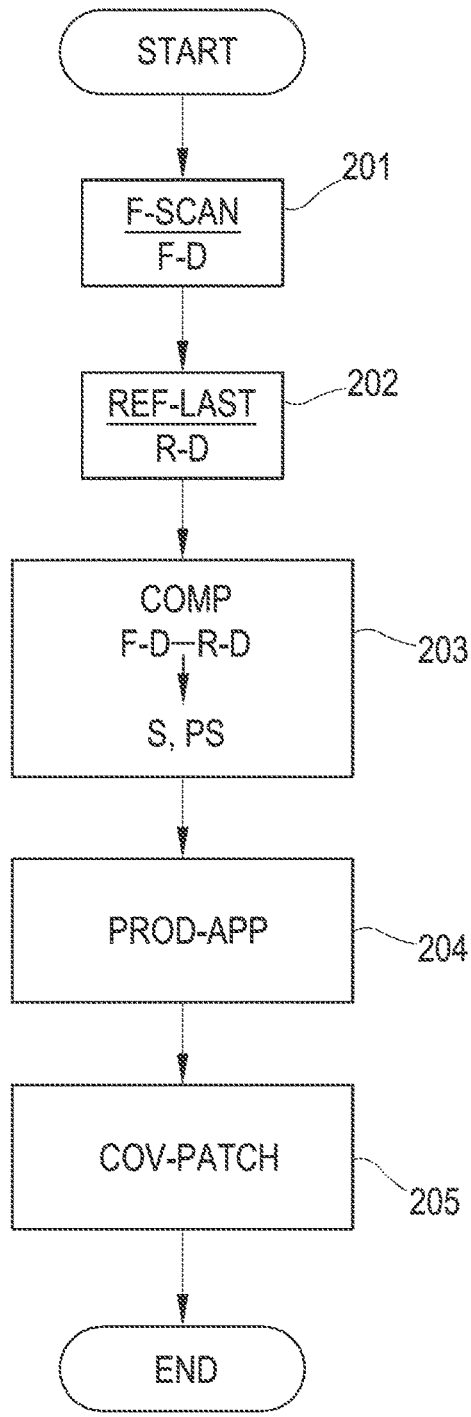
FIG. 2 show a flowchart of shoe-last modification method.

FIG. 2 shows a flowchart representing a method 200 of modifying a shoe-last implementable with the system 100 of FIG. 1.

The method 200 allows modification of a pre-manufactured shoe-last so as to obtain a modified shoe-last to be used to produce a customized shoe.

The method 200 comprises a first step 201 (F-SCAN) in which the acquisition device 101 is employed to acquire current digital data F-D representing the shape of the foot 105 of a custom. The acquired current digital data F-D, which provide for a three-dimensional (3D) representation of the foot surface, are made available to the processing and control module 102.

In a second step 202 (REF-LAST) the processing and control module 102 retrieves from the database 103 reference digital data R-D which represent a shape of a first shoe-last 106 to be modified.

In a third step 203 (COMP), the current digital data F-D and the reference digital data R-F are compared each other to determine difference between the two corresponding surfaces and then design shapes S and positions PS of patch elements 110 (FIG. 1) to be employed to modify the first shoe last 106. Particularly, this comparison, made by the processing and control module 102, allows designing also the sizes of any necessary patch elements 110.

The patch elements 110 are additional bodies to be applied to the first shoe-last 106 to make its shape and volume closer to the shape and volume of the customer's foot, in terms of methods for designing of shoe lasts.

The method 200 proceeds further with manufacturing steps that are performed by the manufacturing apparatus 104 under the control of the processing and control module 102.

In a fourth step 204 (PRO-APP), the device 107 of the manufacturing apparatus 104 creates according to the employed additive manufacturing technique the patches 110 having the shapes S and applies them to the first shoe-last 106 in the corresponding positions PS. The employed additive manufacturing techniques allows creating the patch elements 110 directly on the first shoe-last surface.

It is observed that the patch elements 110 are detachable from the shoe-last on which they have applied, without creation of a significant impact on the or last, so as to permit a further utilization of the involved shoe-last, as it can be used again in according to its primary function, or for another modifications with temporary patching method.

Advantageously, method 200 also comprises a fifth step 204 (COV-PATCH) in which at least the applied patch elements 110 are covered with a coating made by a material compatible with the shoe manufacturing process. The covering material allows smoothing the transition surfaces between the patch elements 110 and the shoe-last 106, also useful for better fixing of the patch elements on the surface of the last. The fifth step can be performed by a spray-coating technique employing a spray head 111, preferably, mounted on the same manufacturing apparatus 104, or by a separate/dedicated apparatus, performing the described above function.

As regard the material of the patch elements 110, it is observed that this material is preferably different from the one of the shoe-last, since it's intended for a limited number of uses by the manufacturing process, or just a single use, unlike the main shoe last, which is normally thought as a highly reusable object.

The patch elements 110 can be obtained starting from the following powder materials: thermoplastic powders, composite plastic powders, nano-composite plastic powders, or another (new or combined) materials, with similar characteristics from the point of view of patch producing and application process.

Examples of employable materials are:
1) Name: ABS; Type: Thermoplastic; Printing: PolyJet
2) Name: PC; Type: Thermoplastic; Printing: Fused Deposition Modeling;
3) Name: PC/ABS HYBRID; Type: Composite plastic; Printing: Fused Deposition Modeling
4) Name: SLA ACCURA BLUESTONE; Type: Nano-composite plastic; Printing: Stereolithography and Digital Light Processing;
5) Name: ULTEM; Type: Thermoplastic; Printing: Fused Deposition Modeling.

It is observed that thermoplastic powders to printed with a fused deposition modeling process are preferable.

With reference to the coating material, it can be a liquid or liquid epoxy kind of impact resistance protective coating for smoothing and finishing of 3D printed parts or compatible with 3D printing used materials.

Figure 3:
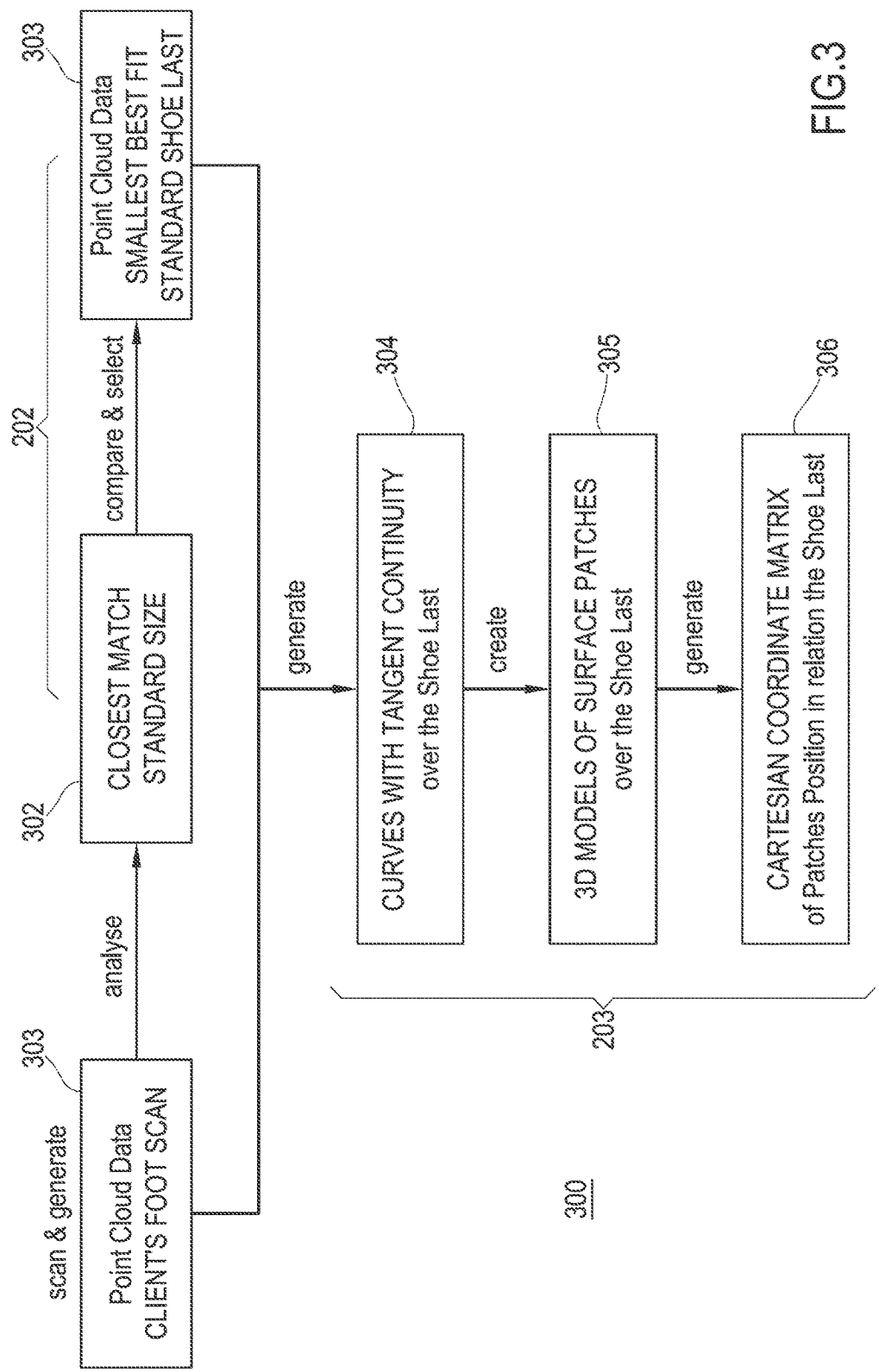
FIG. 3 is a flowchart of computing steps employable by said shoe-last modification system and method.

It is observed that, according to another embodiment, the production of the patch elements and their application to the shoe-last 106 can be performed in temporally separate steps and with different apparatuses. The fixing of the already produced patch elements 110 on the shoe-last 106 at predetermined positions can be made by means of further adhesive material and/or said coating material or by other suitable fixing techniques. FIG. 3 shows a flowchart representing a particular computing method 300 for computing shapes and positions of the patch elements 110, in accordance with the method 200 described above. The computing method 300 can be implemented with CAD/CAM technology.

The specific computing method 300 can be implemented in accordance with the teachings provided by the document "Computer Aided Design and Development of Customized shoe Last", Kumar Sambhav et al., Computer-Aided Design & Applications, 8(6), 2011; pages 819-826, herein enclosed as reference.

The computing method 300 includes the first step 201 wherein the acquisition apparatus 104 performs a scanning and generation of point cloud data for the foot 105. A point data cloud is a set of data points in some coordinates system. In a three-dimensional coordinate system, these points are usually defined by X, Y and Z coordinates and represent the external surface of the customer's foot 5. The point cloud data corresponds to the current digital data F-D of the first step 201. The scanning and generation of point cloud data is described at paragraph 2.1 of the above mentioned article of Kumar Sambhav et al.

Moreover, according to computing method 300 the second step 202 of the method 200 is performed by a retrieving step 302 and a selection step 303.

In the retrieved step 302 a plurality of point cloud and related to it biometric and/or analytical measurements, each corresponding to a shoe-last among the ones available for manufacturing shoes, is retrieved. Particularly, in the retrieving step 302 a group of shoe-lasts having size closest to the one of the foot 5 is pre-selected.

In the selection step 303 the digital representation of the foot and the digital representations of the preselected shoe-lasts are aligned to allow future comparison. The alignment is also described in paragraph 2.3 of the above mentioned article of Kumar Sambhav et al.

Moreover, in the selection step 303 the first shoe-last is selected by choosing the one for which minimum rectification is needed, i.e. the shoe-last which is the most similar to the scanned foot 5. This selection can be made as indicated in paragraph 2.4 of the above mentioned article of Kumar Sambhav et al. The minimum difference is determined considering the foot volume and the volume of the shoe-last, or by combined methods, based on measurements, analytics and volume.

According computing method 300, the third step 203 of the method 200 is performed by the following steps: curve generation step 304, patch surface, shape and volume definition step 305 and patch position determination step 306.

In curve generation step 304, curves with tangent continuity over the first shoe-last are generated. The curve generation step 304 is the base for the following blending of the curves, in order to create the surface patches. This step is described at paragraph 2.5 of the above-mentioned article of Kumar Sambhav et al.

Moreover, as described at paragraph 2.6 of the above-mentioned article of Kumar Sambhav et al., starting from the curves obtained in the curve generation step 304 it is possible to determine a three-dimensional model of the surfaces of the needed patch elements (step 305) and the Cartesian coordinates of the patch element's position over the first shoe-last (step 306). The patch surface definition step 305 and the patch position determination step 306 can be performed as indicated at paragraph 2.6 of the above-mentioned article of Kumar Sambhav et al.

As clear from the above description, the method of modifying a shoe-last 200 and the system 100 described above allow obtaining customized shoes in a precise and efficient manner without wastefulness of the shoe-lasts.

The above described system and method permit an efficient and economical implementation of footwear customization, sometimes referred as "industrial made to measure", which should to be compatible with any almost kind of footwear manufacturing, as it is not assuming any modification of the shoe production process itself, and makes the operation of last patching not impactful on the level of supply chain and the other manufacturing setup operations, or with a minimal impact to them.

While the main focus of the present description is the manufacturing side and processes, this improvement intended to lead to a possibly higher and quicker adaptation of the made to measure retailing offers to the customers, allowing shoppers to purchase fully personalized tailor-made footwear with the same comfort as they shop nowadays for the standard sizes products.

The invention claimed is:

1. A method of modifying a shoe-last, comprising:
   acquiring current digital data representing a foot shape;
   receiving reference digital data representing a shoe-last shape;
   comparing the current digital data with the reference digital data to design patch shapes and patch positions;
   producing patch elements corresponding to the patch shapes; and
   applying the patch elements on a shoe-last corresponding to the reference digital data and in accordance with the patch positions to obtain a modified shoe-last;
   wherein the steps of producing the patch elements and applying the patch elements are performed by employing an additive manufacturing technique.

2. The method of claim 1, wherein said patch elements are detachable from the shoe-last.

3. The method of claim 1, wherein said patch elements are made by a first material having mechanical features allowing the use of the modified shoe-last in a shoe manufacturing process.

4. The method of claim 3, wherein said first material is different from a second material employed to manufacturing said shoe-last.

5. The method of claim 1, further comprising:
   covering at least said patch elements with a coating made by a coating material compatible with said shoe manufacturing process.

6. The method of claim 5, wherein said covering includes performing a spray-coating.

7. The method of claim 1, wherein said patch elements are made by a material chosen among the following materials: thermoplastic powders, composite plastic powders, nano-composite plastic powders.

8. The method of claim 7, wherein said additive manufacturing technique is one of the following techniques: fused deposition modeling; PoLyJet, Stereolithography combined with Digital Light Processing.

9. The method of claim 7, wherein:
   acquiring digital data representing foot shape and foot volume comprises:
     performing a 3D scan of a user's foot; and
   providing reference digital data representing a shoe-last shape comprises:
     comparing the current digital data with a plurality of groups of digital data each group associated with an available shoe-last; and
     selecting a group of digital data as the reference digital data which corresponds to a shoe-last which best fits the current digital data.

10. A shoe-last modification system, comprising:
    an acquisition device configured to acquire current digital data representing a foot shape;
    a processing and control module configured to:
      receive reference digital data representing a shoe-last shape;
      compare the current digital data with the reference digital data to design patch shapes and patch positions; and
    at least one manufacturing apparatus operating according to an additive manufacturing technique under the control of the processing and control module, the manufacturing apparatus being structured to:
      produce patch elements corresponding to said patch shapes; and
      apply the patch elements on a shoe-last corresponding to the reference digital data and in accordance with said patch positions so as to obtain a modified shoe-last.

11. The system of claim 10, wherein said patch elements are detachable from the shoe-last.

12. The system of claim 10, wherein said patch elements are made by a first material having mechanical features allowing the use of the modified shoe-last in a shoe manufacturing process.

13. The system of claim 12, wherein said first material is different from a second material employed to manufacturing said shoe-last.

14. The system of claim 10, further comprising:
    a spray head configured to perform a spray-coating technique to cover at least said patch elements with a coating made by a coating material compatible with said shoe manufacturing process.

15. The system of claim 10, wherein said patch elements are made by a material chosen among the following materials: thermoplastic powders, composite plastic powders, nano-composite plastic powders.

16. The system of claim 10, wherein said at least one manufacturing apparatus is configured to operate according one of the following techniques: fused deposition modeling; PoLyJet, Stereolithography combined with Digital Light Processing.

* * * * *